United States Patent [19]

Lee et al.

[11] Patent Number: 5,838,923
[45] Date of Patent: Nov. 17, 1998

[54] METHOD AND SYSTEM FOR SYNCHRONIZING COMPUTER MAIL USER DIRECTORIES

[75] Inventors: Duncan Wayne Lee, New Westminster, Canada; Mark Ledsome, Seattle, Wash.

[73] Assignee: Microsoft Corporation, Redmond, Wash.

[21] Appl. No.: 686,176

[22] Filed: Jul. 22, 1996

Related U.S. Application Data

[63] Continuation of Ser. No. 81,444, Jun. 22, 1993, abandoned.

[51] Int. Cl.$^6$ ..................................................... G06F 13/42
[52] U.S. Cl. ............................... 395/200.66; 395/200.36; 395/200.67; 707/201; 371/32
[58] Field of Search ......................... 364/DIG. 1, DIG. 2; 395/200, 600, 650, 200.61–200.67, 200.78, 200.6, 285, 286, 200.36, 671, 855; 707/1, 2, 100, 104, 200, 201; 371/32, 33

[56] References Cited

U.S. PATENT DOCUMENTS

| | | | |
|---|---|---|---|
| 4,562,539 | 12/1985 | Vince ........................................ | 364/200 |
| 4,653,048 | 3/1987 | Anderson et al. ........................ | 370/94 |
| 5,036,518 | 7/1991 | Tseung ...................................... | 371/32 |
| 5,046,002 | 9/1991 | Takashi et al. .......................... | 395/600 |
| 5,222,061 | 6/1993 | Doshi et al. .............................. | 370/394 |
| 5,257,369 | 10/1993 | Skeen et al. .............................. | 395/650 |
| 5,262,942 | 11/1993 | Earle ......................................... | 364/408 |
| 5,315,635 | 5/1994 | Kane et al. ............................... | 379/57 |
| 5,335,324 | 8/1994 | Orimo et al. ............................. | 395/200 |
| 5,363,090 | 11/1994 | Cannon et al. ....................... | 340/825.44 |
| 5,392,336 | 2/1995 | Chang et al. .............................. | 379/93 |
| 5,396,537 | 3/1995 | Schwendeman .......................... | 379/57 |
| 5,432,798 | 7/1995 | Blair .......................................... | 371/32 |
| 5,442,637 | 8/1995 | Nguyen .................................... | 371/5.5 |
| 5,444,850 | 8/1995 | Chang ................................... | 395/200.1 |

OTHER PUBLICATIONS

SoftSwitch Directory Synchronization Architecture, Implementation, and Protocol Guide, Chapters 3–4, Appendices A–B, pp. 69–114, No Date.
Andrew S. Tannenbaum, "Computer Networks, Second Edition," Prentice Hall, 1989, pp.14–21.
Siyan, Karanjit, "NetWare:The Professional Reference, $2^{nd}$ Edition," *New Riders Publishing* 1993, pp. 27–36.
Szczerbina, Pawel, "Novell's NetWare Core Protocol," *Dr. Dobb's Journal*, Nov., 1993, pp. 123–132.

*Primary Examiner*—Maria N. Von Buhr
*Attorney, Agent, or Firm*—Seed and Berry LLP

[57] ABSTRACT

A method and system for synchronizing directories containing information about computer mail users. In a preferred embodiment, a computer mail facility synchronizes a user directory stored in a responding directory node with a more current user directory stored in an originating directory node. Directory update transactions are received in the originating node and assigned a sequence number to denote the consecutive order of acquisition. The sequence number is relative to an originating sequence number which tracks the completed transmission of the transactions to the responding node. The transactions are processed by the originating node and subsequently transmitted to the responding directory node. Upon receipt of the transactions, the responding node transmits a confirmation message indicating the largest consecutive sequence number of a received transaction. This is used by the originating directory node to determine whether the responding node has received a complete set of the transactions. The sequence number in the confirmation message is then used to set the originating sequence number.

40 Claims, 10 Drawing Sheets

MASTER DIRECTORY NODE 601

DIRECTORY 602

| NAME | ADDRESS |
|---|---|
| cosby | nodex |
| martin | nodef |
| newhart | nodex |

ORIGINATING SYNCH NUMBER 603

| LOCAL ROUTING NODE | NUMBER |
|---|---|
| dir1 | 235 |
| dir2 | 235 |
| dir3 | 235 |
| dir4 | 235 |

RESPONDING SYNCH NUMBER 604

| LOCAL ROUTING NODE | NUMBER |
|---|---|
| dir1 | 8 |
| dir2 | 43 |
| dir3 | 0 |
| dir4 | 19 |

TRANSACTION TABLE 605

| TRANSACTION SEQUENCE NUMBER | TRANSACTION |
|---|---|
| 236 | change ("martin", "nodef") |
| 237 | delete ("wilson") |
| 238 | add ("newhart", "nodex") |

*FIG. 6*

METHOD AND SYSTEM FOR SYNCHRONIZING COMPUTER MAIL USER DIRECTORIES

CROSS-REFERENCE TO RELATED APPLICATION

This application is a file wrapper continuation of U.S. Pat. application No. 08/081,444, filed Jun. 22, 1993, now abandoned.

TECHNICAL FIELD

The invention relates generally to a method and system for maintaining the synchronization of separate files, and, more specifically, to a method and system for synchronizing user directories in a computer mail system.

BACKGROUND OF THE INVENTION

Computers have long been used by human users to communicate with other human users. In a computer mail system, also known as an electronic mail system, a user may send messages to other users. Messages may contain text, or data in any other form. After a message is sent by a sending user to a receiving user, the message is stored in a computer system until the receiving user is able to examine it.

Computer mail systems (mail system) comprise one or more computer systems, called nodes. In a single node mail system, a sending user sends a message from the same node at which the receiving user receives the message. In a multiple node mail system, several nodes are connected together by a computer network (network), which allows a node to transmit data to other nodes. The network in a multiple node mail system permits a sending user to send a message from a sending node to a receiving user at a separate receiving node. In order to correctly route such an inter-node message to the node at which the receiving user expects to receive it, computer mail systems usually maintain a user directory (directory).

A directory contains the names of users and the nodes at which they expect to receive messages. When a sending user sends a message to a receiving user, the computer mail system first accesses the directory to determine the node at which the receiving user expects to receive messages, then transmits the message to that node.

Since computer networks often contain hundreds of nodes, it is in some cases desirable to maintain several directories on nodes at different locations within the network. (A node on which a directory is maintained is known as a directory node.) This allows the mail system to transmit a message from the sending node to a nearby directory node for routing, reducing the overall travel of the message.

Maintaining multiple directories presents the challenge of synchronization: each directory must contain a current list of mail system users, as well as the correct receiving node for each user. This problem would be trivial if directories were invariant: once the mail system generated the first directory, it could merely copy it once to different directory nodes. However, users sometimes change their receiving node, or are added to or deleted from the list of users. It is also impractical to copy the entire directory each time it changes, as the large size of the entire directory adds an unacceptable transmission load to most networks.

In order to maintain the synchronization of directories in light of these problems, some mail systems employ a scheme of transactional updates. In such a scheme, when a user is added or deleted, or changes his or her receiving node, the mail system generates a user update transaction (transaction) containing the information required to update a directory to reflect this change. The mail system transmits the transaction to every directory node in order to update the directory node's directory.

The shortcoming of the transactional update scheme is that, in order for transactions to be intelligible, they must be processed in the same order that they are generated. Transactions may be received in an order different than the one in which they are generated, due to transmission errors within the network. For example, if a user is added, then deleted, and the mail system processes the delete transaction before the add transaction, the delete transaction causes an error, and afterwards the user erroneously remains in the list of users.

SUMMARY OF THE INVENTION

It is an object of the invention to provide a method and system in a computer mail system for synchronizing a user directory stored in a responding directory node with a more current user directory stored in an originating directory node.

It is another object of the invention to provide a method and system in a computer mail system for transmitting to a responding directory node sequential directory update transactions for updating the contents of a user directory stored in an originating directory node.

It is a further object of the invention to provide a method and system in a responding directory node in a computer mail system for receiving and confirming sequential directory update transactions transmitted from an originating directory node.

These and other objects, which will become apparent as the invention is more fully described below, are provided by a method and system for synchronizing directories containing information about computer mail users. In a preferred embodiment, a computer mail facility synchronizes a user directory stored in a responding directory node with a more current user directory stored in an originating directory node. The facility first acquires in the originating directory node one or more directory update transactions for updating the contents of the user directory stored in the originating directory node. The facility assigns a consecutive sequence number to each transaction indicating the order of acquisition. The facility then updates the contents of the user directory stored in the originating directory node by processing the transactions in the order of their sequence numbers. At a later time, the facility selects a series of the transactions for transmission to the responding directory node. The sequence number of the first directory update transaction in the series is consecutive to an originating directory node synchronization number that stores the sequence number of a last confirmed transmitted directory update transaction. Also, the assigned sequence numbers of all directory update transactions in the series are consecutive. After selecting the series of transactions, the facility transmits transactions of the series from the originating directory node to the responding directory node. The facility receives the transactions of the series in the responding directory node, then transmits a confirmation message indicating the largest consecutive sequence number of the received directory update transactions from the responding directory node to the originating directory node. Upon receiving the confirmation message in the originating directory node, the facility sets the originating directory node synchronization number to the sequence number indicated by the confirmation message.

BRIEF DESCRIPTION OF THE DRAWINGS

FIG. 6 is a block diagram of the state of the master directory node after receiving transactions from the local directory node dir1.

DETAILED DESCRIPTION OF THE INVENTION

Figure 1:
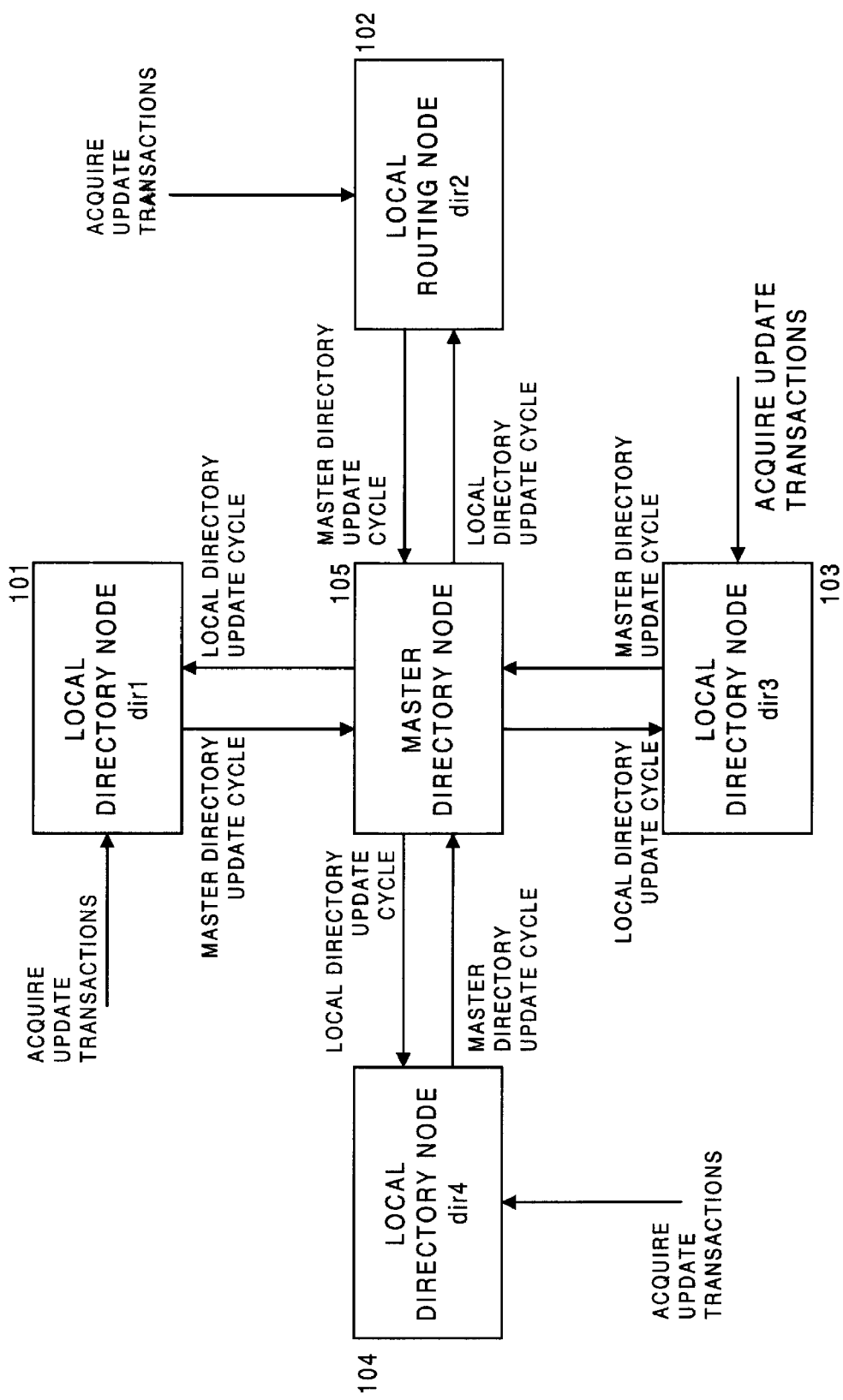
FIG. 1 is a block diagram showing the structure of and interaction within the computer mail system.

A method and system for synchronizing directories containing information about computer mail users is provided. In a preferred embodiment, a computer mail facility (facility) synchronizes a user directory (directory) stored in a responding directory node (responding directory) with a more current directory stored in an originating directory node (originating directory). The facility first acquires in the originating directory node (originating node) one or more directory update transactions (transactions) for updating the originating directory. The facility assigns a consecutive sequence number to each transaction indicating the order of acquisition. The facility then updates the originating directory by processing the transactions in the order of their sequence numbers. At a later time, the facility selects a series of the transactions for transmission to the responding directory node (responding node). The selected transactions are known as outstanding transactions. The sequence number of the first transaction in the series is consecutive to an originating directory node synchronization number (originating synchronization number) that stores the sequence number of a last confirmed transmitted transaction. Also, the assigned sequence numbers of all transactions in the series are consecutive. After selecting the series of transactions, the facility transmits transactions of the series from the originating node to the responding node. The facility receives the transactions in the responding node, then transmits a confirmation message indicating the largest consecutive sequence number of the received transactions from the responding node to the originating node. Upon receiving the confirmation message in the originating node, the facility sets the originating synchronization number to the sequence number indicated by the confirmation message.

In a preferred embodiment, the facility also utilizes a responding directory node synchronization number (responding synchronization number). The facility sets the responding synchronization number to the sequence number of the last transaction received and processed in the responding node. When the facility receives further transactions in the responding node, it only processes those that are consecutive to each other and to the responding synchronization number The networks that connect multiple node mail systems are sometimes susceptible to the problems of transmission loss or delay. Even in cases of transmission loss and or delay the facility ensures that all transactions acquired in the originating node are received and processed in the responding node in the order in which they were acquired. One such case of transmission loss and or delay is the loss of a transaction transmission message. If the facility transmits a series of transactions from the originating node to the responding node that are not received in the responding node, the responding node does not transmit a confirmation message. The originating synchronization number is therefore not set to the sequence number of the last transaction received and processed in the responding node, but rather remains at one less than the sequence number of the first transaction in the lost series transaction in the lost series. When the facility next transmits transactions from the originating node to the responding node, the transactions of the lost series are included in the new series that is transmitted.

Another such case of transmission loss and or delay is the loss of a confirmation message. If the facility transmits a confirmation message from the responding node to the originating node that is not received in the originating node, the next series that the facility transmits from the originating node to the responding node erroneously contains transactions that have been successfully received and processed in the responding node. However, when the responding node receives the series it processes only those transactions whose sequence numbers are larger than the responding synchronization number. As a result, the redundant transactions are not processed again.

A further such case of transmission loss and or delay is the delay of a confirmation message. As above, the facility retransmits in a second transaction transmission the transactions whose confirmation message is delayed to the responding node, but does not reprocess them. If the confirmation message for the second transmission arrives before the delayed confirmation message, the facility will set the originating synchronization number to the sequence number contained in the confirmation message for the second transmission, then ignore the smaller sequence number contained in the delayed confirmation message. If the confirmation message for the second transmission arrives after the delayed confirmation message, then the facility will first set the originating synchronization number to the smaller sequence number contained in the delayed confirmation message, then to the larger sequence number contained in the confirmation message for the second transmission. In either case, the originating synchronization number is eventually set to the larger sequence number contained in the confirmation message for the second transmission.

FIG. 1 is a block diagram showing the structure of and interaction within the computer mail system. Local nodes 101–104 acquire directory update transactions from connected subscriber nodes (not shown). In a preferred embodiment, an add user transaction associates a local node with the new user. When other transactions are subsequently generated with respect to a particular user, they are transmitted to and acquired by the associated local node. This ensures that all transactions that apply to a particular user are properly sequenced. In each case, the assigned local node is preferably the nearest local node to the user's address. The local directory nodes regularly transmit the update transactions that they have received to a master directory node 105 in a master directory update cycle. The master node regularly transmits the update transactions that it has received from local nodes to all of the local nodes in local directory update cycles.

Figure 2:
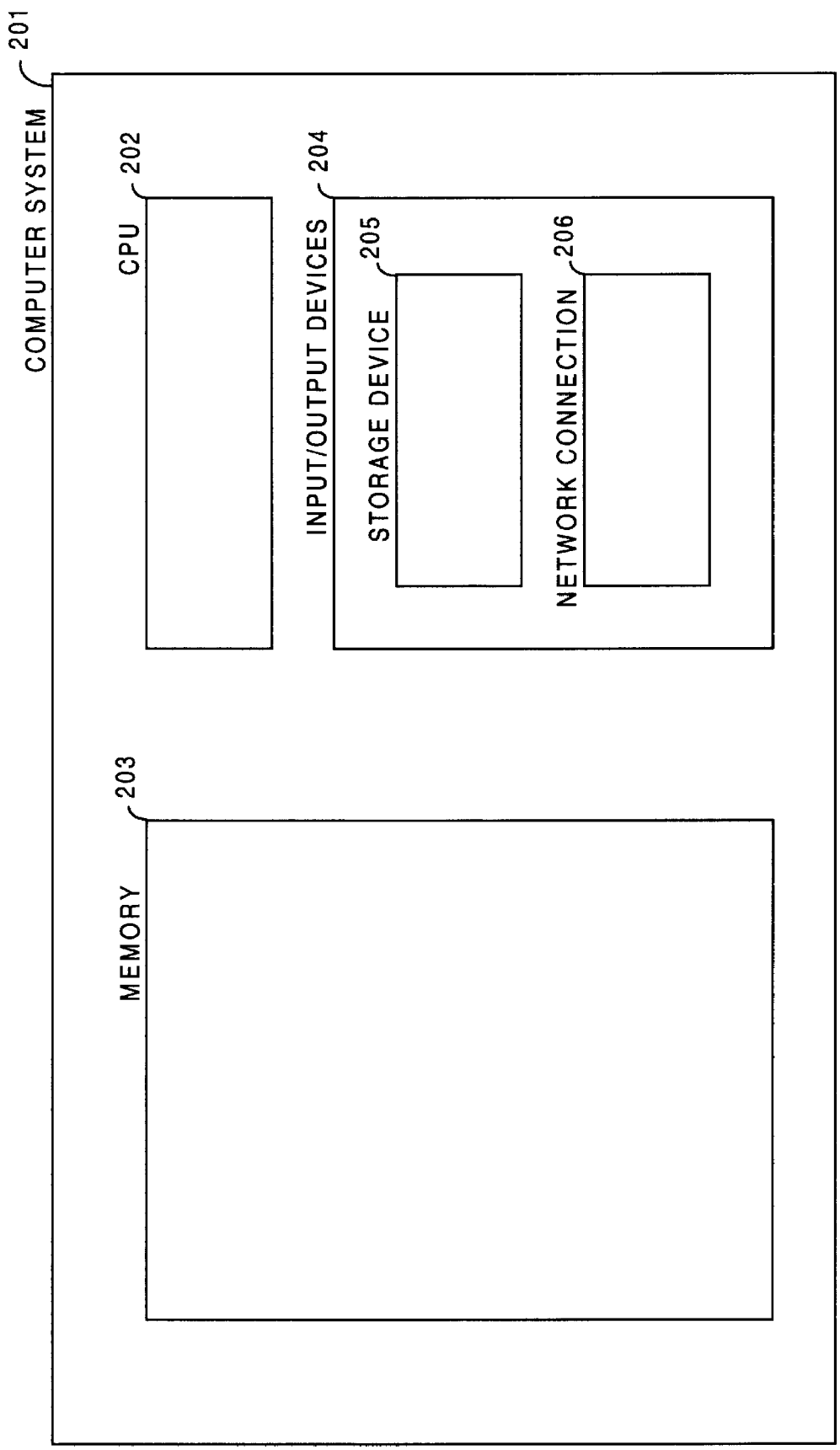
FIG. 2 is a high-level block diagram of one of the general-purpose computer systems that preferably comprise the local and master directory nodes and upon which the facility preferably operates.

FIG. 2 is a high-level block diagram of one of the general-purpose computer systems that preferably comprise the local and master nodes and upon which the facility preferably operates. The computer system 201 contains a central processing unit (CPU) 202, a computer memory (memory) 203, and input/output devices 204. Among the input/output devices are a storage device 205, such as a hard disk drive and a network connection 206. The computer system can use its network connection to transmit data to and receive data from other computer systems. The computer programs that preferably control the actions of the facility reside in the memory and execute on the CPU.

Master directory update cycles and local directory update cycles are performed in a similar manner. Because the update cycles are performed in a similar manner, they are described here generically. The facility performs an update cycle periodically from each directory node. During the master directory update cycle, the local node is updating the master directory. Therefore the local node is the originating node, transmitting transactions to the responding node, which is the master node. During the local directory update cycle, the master node is updating the local directory. Therefore the master node is the originating node, transmitting transactions to the responding node, which is the local node.

Figure 3:
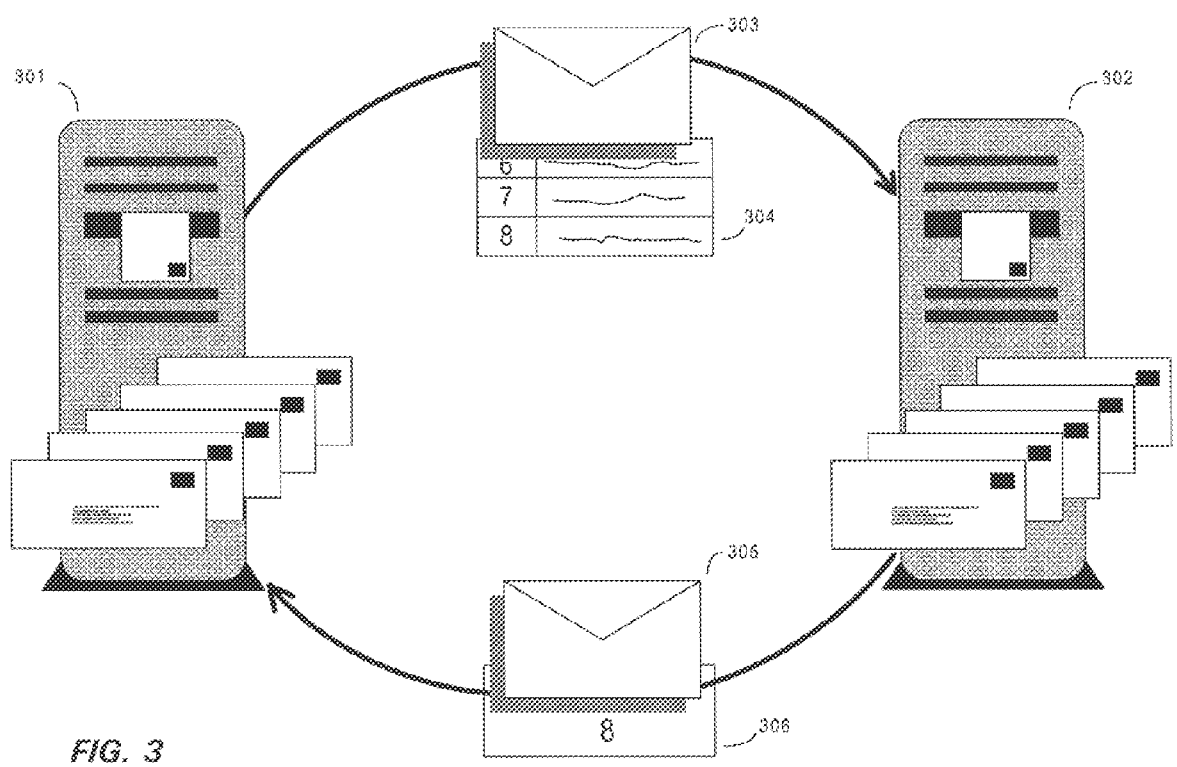
FIG. 3 is a transmission diagram illustrating the generic directory update cycle.

FIG. 3 is a transmission diagram illustrating a generic directory update cycle. An originating node 301 is connected to a responding node 302 by a computer network. The computer network may contain other nodes intermediate to the originating node and the responding node. First, the originating node transmits to the responding node a transaction message 303. The transaction message contains transmitted transactions 304 for updating the responding directory. When the responding node receives the transaction message, it updates the responding directory by processing each of the transmitted transactions. The responding node then transmits a confirmation message 305 back to the originating node. The confirmation message contains the sequence number of the last transaction 306 processed by the responding node. When the originating node receives the confirmation message, it makes a record of the sequence number of the last transaction processed by the responding node so that it does not have to retransmit the same transactions confirmed again later.

Figure 4:
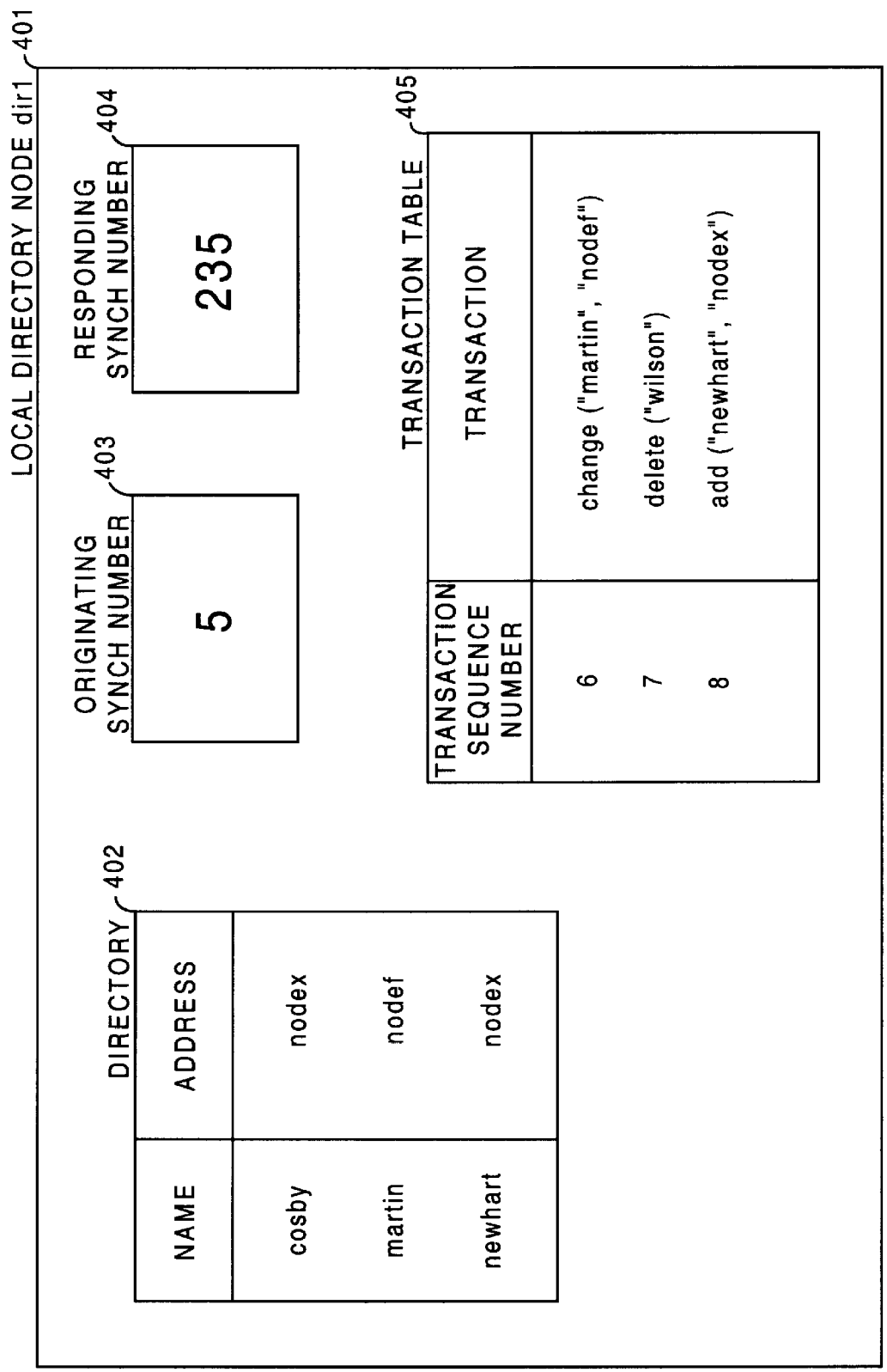
FIG. 4 is a block diagram of the initial state of a local directory node dir1.

FIG. 4 is a block diagram of the initial state of local directory node dir1. The local directory node 401 has a directory 402 and originating synchronization number 403, a responding synchronization number 404, and a transaction table 405. The directory contains the names of mail users and the nodes at which they expect to receive mail. These nodes are called the users' addresses. The originating synchronization number indicates the sequence number of the last transaction transmitted to the master node to which the master node has responded with a confirmation message. The responding synchronization number indicates the last consecutive transaction that the local node has received from the master node. Transactions received from the master node have been used to update the directory, as have transactions acquired initially by the local node. The transaction table contains outstanding transactions and their sequence numbers. The transaction having sequence number 6 will, when processed, cause the address of a user "martin" to be changed, the transaction having sequence number 7 will cause a user "wilson" to be deleted, and the transaction having sequence number 8 will cause a user "newhart" to be added. These are transactions that have been acquired by the local node and that the local node has either not transmitted to the master node, or that the local node has transmitted to the master node but has not received a confirmation message for. When the facility periodically attempts to transmit outstanding transactions to the master node, it will transmit the transactions contained in the transaction table.

Figure 5:
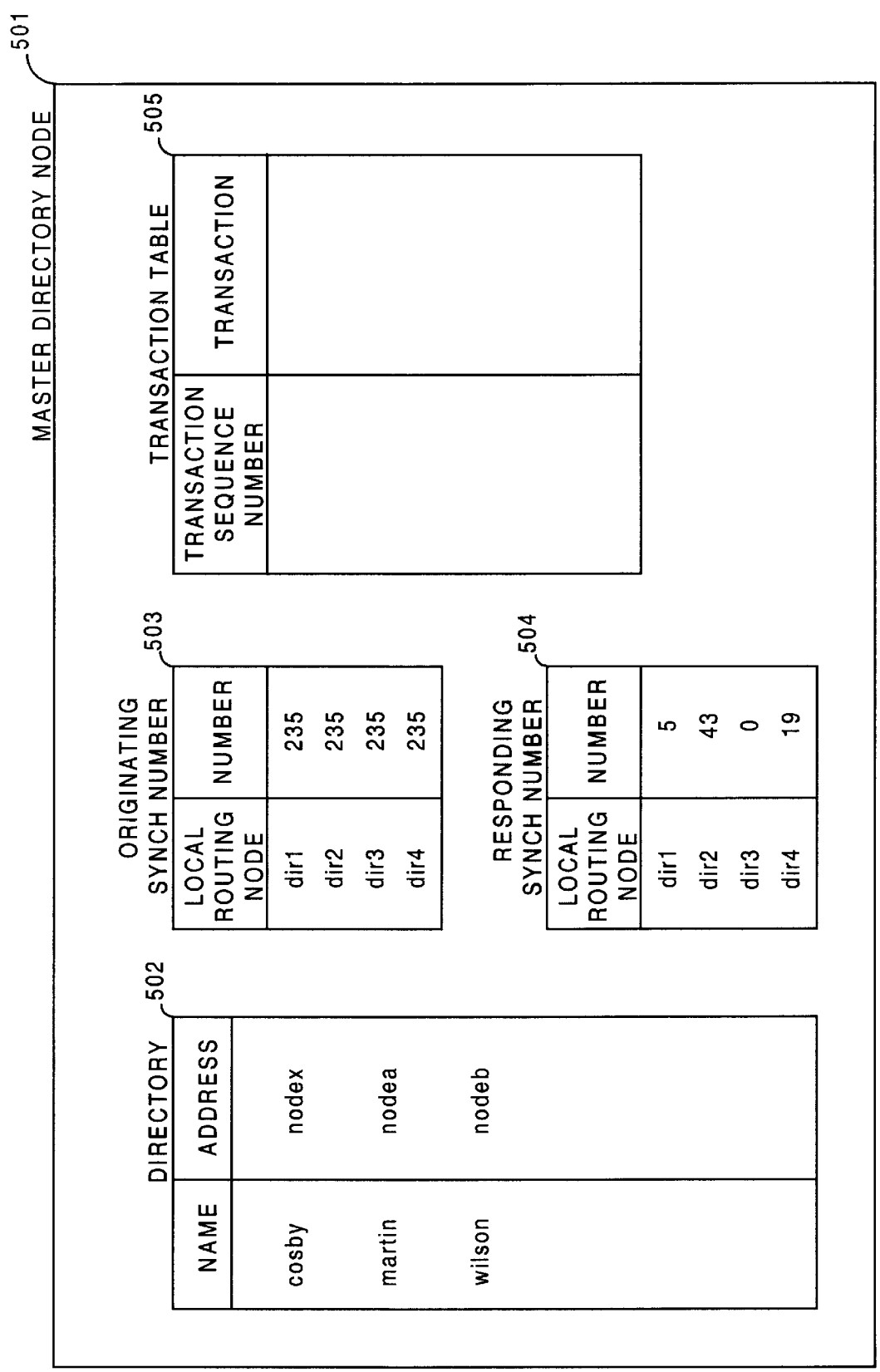
FIG. 5 is a block diagram of the initial state of the master directory node.

FIG. 5 is a block diagram of the initial state of the master directory node. The master directory node 501 has a directory 502, an originating synchronization number table 503, a responding synchronization number table 504, and a transaction table 505. The directory contains the names and addresses of mail users as updated with transactions transmitted from local nodes. The originating synchronization table indicates the sequence number of the last transaction transmitted to each local node to which the master node has responded with a confirmation message. Here, the local node has transmitted transactions through sequence number 235 to the local nodes, and the local nodes have all responded with a confirmation message. The responding synchronization table indicates the last consecutive transaction that the master node has received from each local node. The transaction table is empty of outstanding transactions. This means that all transactions transmitted by the master node have been confirmed by the local nodes to which they were transmitted.

FIG. 6 is a block diagram of the state of the master directory node after receiving transactions from local directory node dir1. The local node has transmitted the transactions having sequence number 6, 7 and 8. The master node received these transactions and updated its directory by processing them. In the directory, the address of a user "martin" has been changed, a user "wilson" has been deleted, and a user "newhart" has been added. The master node has transmitted a confirmation message to the local node containing the sequence number of the last consecutive transaction received—8. The master node has set its responding synchronization number for local node dir1 to the sequence number of the last consecutive transaction received—8.

When the master node received the transactions having sequence numbers 6, 7, and 8 from the local node, it acquired the transactions. The master node then assigned its own sequence numbers, 236, 237, and 238, to the transactions, and stored the transactions with their sequence numbers in its transaction table. Here the transactions will wait for the next local directory update cycle. At that point, all the transactions in the transaction table whose sequence number is greater than the master nodes originating synchronization number will be transmitted to all of the local nodes. When the local nodes receive the transactions, they will update their directories by processing the transactions and send a confirmation back to the master node. The master node will use the synchronization message to set the appropriate originating synchronization number to the last consecutive transaction received by the confirming node.

Figure 7:
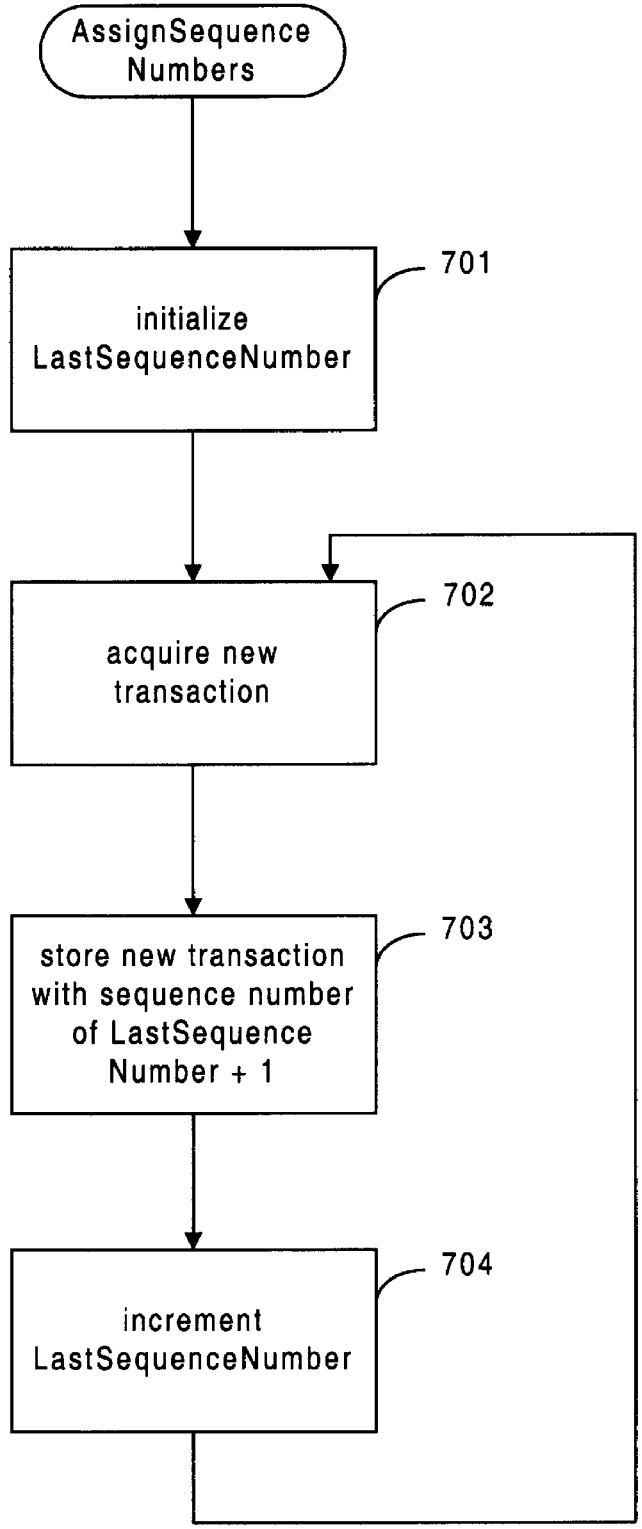
FIG. 7 is a flow diagram of the AssignSequenceNumbers routine.

FIG. 7 is a flow diagram of the AssignSequenceNumbers routine. The AssignSequenceNumbers routine preferably executes continuously on the originating node. When a transaction arrives at the originating node, the facility receives and assigns sequence numbers to it. In step 701, the facility initializes a LastSequenceNumber variable. In step 702, the facility acquires a new transaction. A local node may acquire a transaction either by generating the transaction itself, or receiving it from a subscriber node. A master node may acquire a transaction by receiving it from a local node. In step 703, the facility stores the acquired transaction in the originating node's transaction table, assigning it a sequence number of LastSequenceNumber+1. In step 704, the facility increments the last sequence number to correspond with the sequence number of the newly stored transaction. The facility then continues at step 702 to acquire another transaction.

Figure 8:
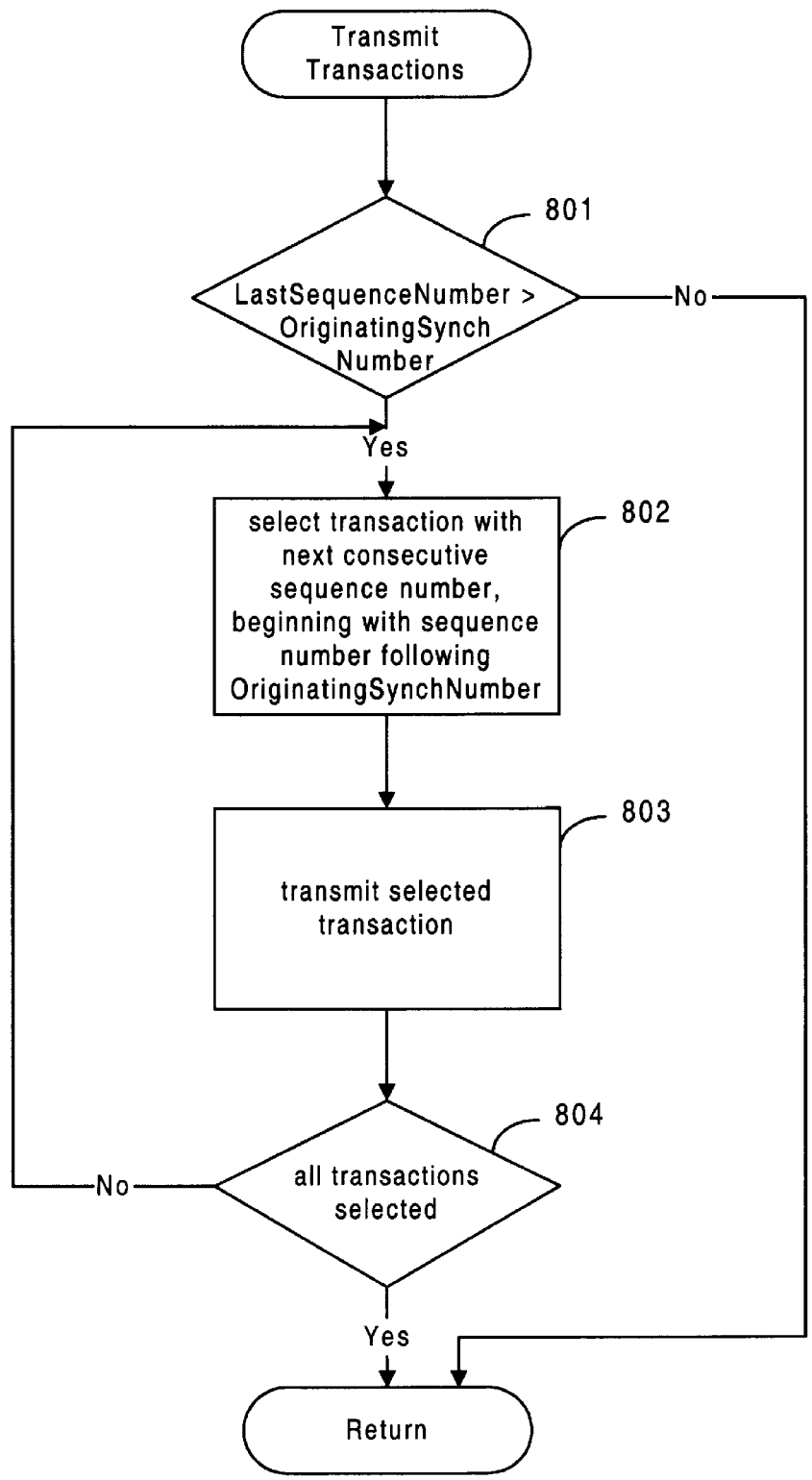
FIG. 8 is a flow diagram of the TransmitTransactions routine.

FIG. 8 is a flow diagram of the TransmitTransactions routine. The facility periodically calls the TransmitTransactions routine to transmit from the originating node to the responding node any outstanding transactions not yet confirmed as received by the responding node. In step 801, if the last sequence number assigned to a transaction by the originating node is greater than the originating synchronization number stored in the originating node, then one or more outstanding transactions have been acquired and not confirmed, and the facility proceeds to step 802 to transmit the outstanding transactions to the responding node, else the facility returns. In step 802, the facility selects the transaction with the next consecutive sequence number, beginning with the sequence number following the originating synchronization number. In step 803, the facility transmits the selected transaction to the responding node. In step 804, if all transactions have been selected, then the facility returns, else the facility continues at step 802 to select another transaction.

Figure 9:
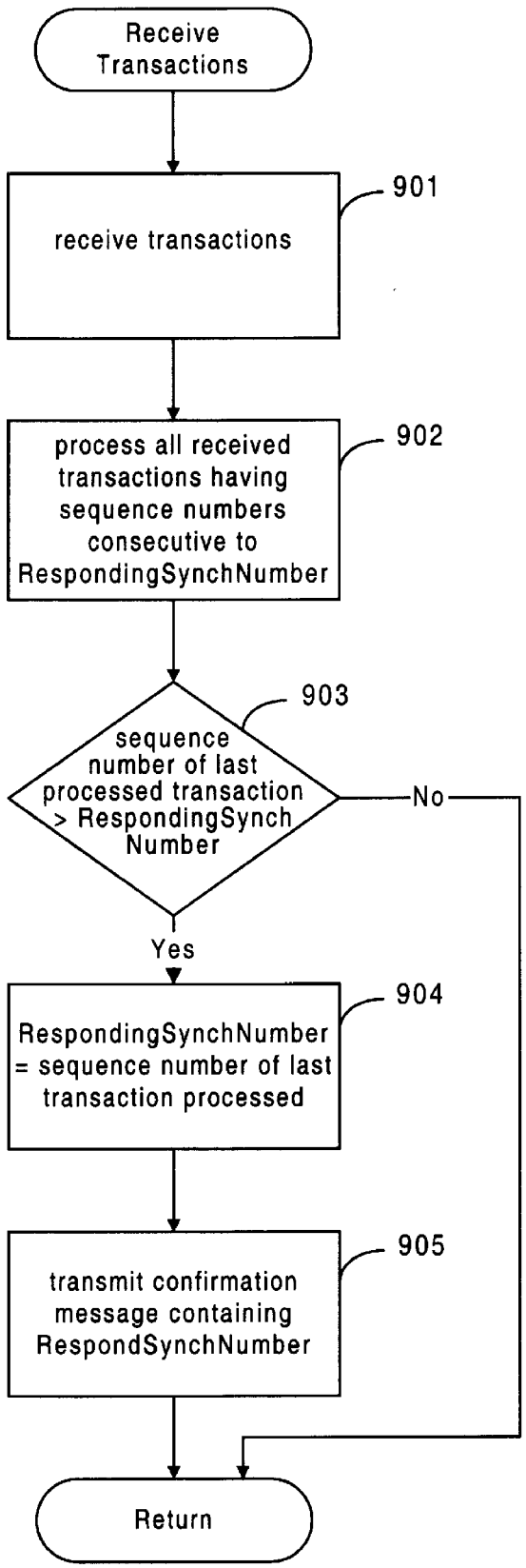
FIG. 9 is a flow diagram of the ReceiveTransactions routine.

FIG. 9 is a flow diagram of the ReceiveTransactions routine. Whenever transactions arrive at the responding node, the facility calls the ReceiveTransactions routine to receive and process them. In step 901, the facility receives transactions transmitted from the originating node. In step 902, the facility updates the responding node directory by processing all of the received transactions whose sequence number is consecutive to the responding synchronization number. In step 903, if the sequence number of the last processed transaction is greater than the responding synchronization number, i.e., a transaction was processed, then the facility continues in step 904, else the facility returns. In step 904, the facility sets the responding synchronization number to the sequence number of the last transaction process. In step 905, the facility transmits a confirmation message to the originating node containing the responding synchronization number. The facility then returns.

Figure 10:
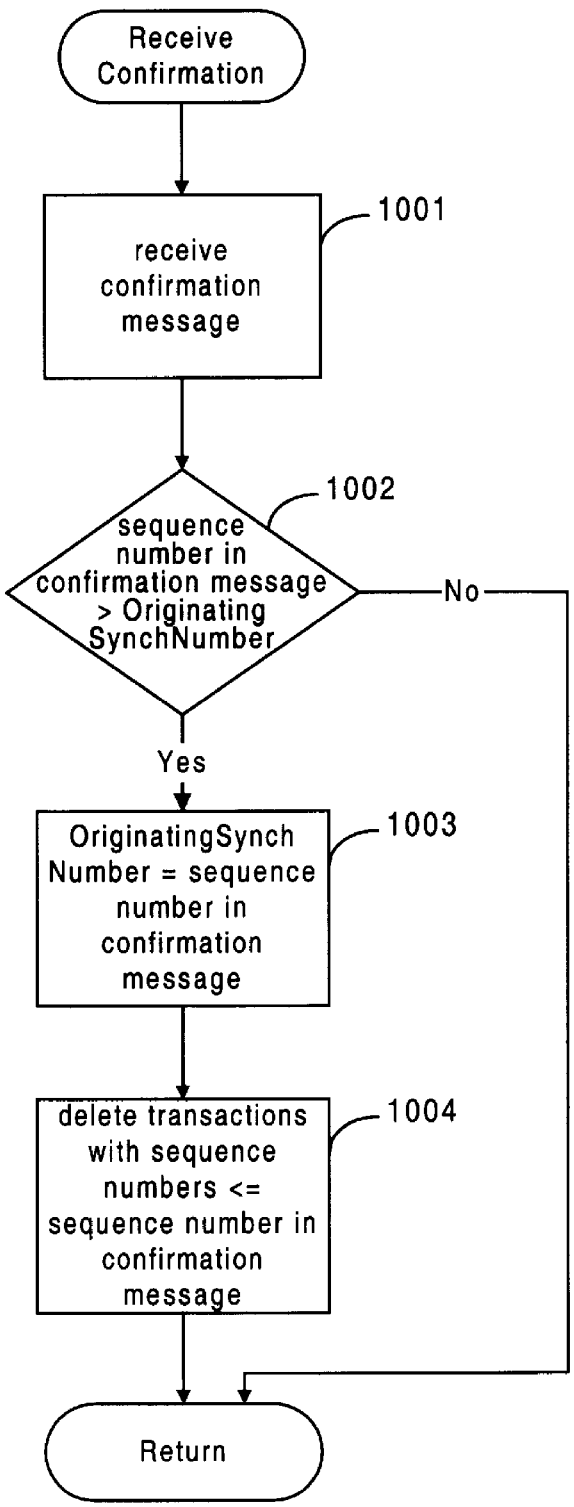
FIG. 10 is a flow diagram of the ReceiveConfirmation routine.

FIG. 10 is a flow diagram of the ReceiveConfirmation routine. Whenever a confirmation message transmitted from the responding node arrives at the originating node, the facility calls the ReceiveConfirmation routine to receive and process it. In step 1001, the facility receives a confirmation message from the responding node. In step 1002, if the sequence number indicated by the confirmation message is greater than the originating synchronization number, then the facility continues at step 1003, else the facility returns. In step 1003, the facility sets the originating synchronization number to the sequence number indicated by the confirmation message. This advances the sequence number of the first transaction that will be transmitted from the originating node the next time it transmits transactions to the responding node. In step 1004, the facility deletes any transactions from the originating node's transaction table that have sequence numbers that are less than or equal to the sequence number indicated by the confirmation message, i.e., the new originating synchronization number. The facility then returns.

While this invention has been shown and described with reference to preferred embodiments, it will be understood by those skilled in the art that various changes or modifications in form and detail may be made without departing from the scope of this invention.

We claim:

1. A method in a computer mail system for synchronizing a user directory stored in a responding directory node with a more current user directory stored in an originating directory node, the method comprising the steps of, for each of a plurality of consecutive synchronization cycles:

acquiring in the originating directory node a plurality of directory update transactions for updating the contents of the user directory stored in the originating directory node;

assigning to each acquired directory update transaction a consecutive sequence number indicating an order of acquisition;

updating the contents of the user directory stored in the originating directory node based on the acquired directory update transactions;

selecting a series of two or more of the acquired directory update transactions for transmission to the responding directory node, the assigned sequence number of the first directory update transaction in the series being consecutive to an originating directory node synchronization number that stores the sequence number of a last confirmed directory update transaction, the assigned sequence numbers of all directory update transactions in the series being consecutive, such that each directory update transaction after the last confirmed directory update transaction is selected;

transmitting the selected series of directory update transactions from the originating directory node to the responding directory node;

receiving in the responding directory node at least one of the directory update transactions in the transmitted series of directory update transactions;

updating the contents of the user directory stored in the responding directory node by processing any directory update transactions received in the responding directory node whose sequence numbers are consecutive to each other and consecutive to a responding directory node synchronization number that stores the sequence number of a last processed directory update transaction;

transmitting from the responding directory node to the originating directory node a confirmation message indicating the largest consecutive sequence number of the directory update transactions received and processed in the responding directory node; and upon receiving the transmitted confirmation message in the originating directory node, setting the originating directory node synchronization number to the sequence number indicated by the confirmation message thereby completing the synchronization of the user directory stored in the responding directory node with the user directory stored in the originating directory node, such that the originating directory node transmits to the responding directory node in each synchronization cycle all directory update transactions acquired after the last confirmed directory update transaction, irrespective of whether these directory update transactions were previously transmitted, so that the responding directory node can receive all of these transactions in order even though some of these transactions may have been previously received in the responding directory node.

2. The method of claim 1 wherein the responding directory node is a master directory node for maintaining a master user directory, and the originating directory node is a local directory node for maintaining a local user directory and for forwarding the directory update transactions to the master directory node in order to update the master user directory, and wherein the directory update transactions further comprise updates to the master user directory.

3. The method of claim 1 wherein the originating directory node is a master directory node for maintaining a master user directory and for broadcasting the directory update transactions to a plurality of local directory nodes for updating local user directories, and the responding directory node is a local directory node for maintaining the local user directory based upon the master user directory, and wherein the directory update transactions further comprise updates to the local user directories.

4. The method of claim 1, wherein the step of updating the contents of the user directory further comprises the steps of:
   if one or more directory update transactions is processed, changing the value of the responding directory node synchronization number to the largest sequence number among the processed directory update transactions; and
   if no directory update transactions are processed, inhibiting the step of transmitting the confirmation message from the responding directory node to the originating directory node.

5. A computer-readable medium having contents that cause a computer mail system to synchronize a user directory stored in a responding directory node with a more current user directory stored in an originating directory mode by performing the steps of, for each of a plurality of consecutive synchronization cycles:
   acquiring in the originating directory node a plurality of directory update transactions for updating the contents of the user directory stored in the originating directory node;
   assigning to each acquired directory update transaction a consecutive sequence number indicating an order of acquisition;
   updating the contents of the user directory stored in the originating directory node based on the acquired directory update transactions;
   selecting a series of the acquired directory update transactions for transmission to the responding directory node, the assigned sequence number of the first directory update transaction in the series being consecutive to an originating directory node synchronization number that stores the sequence number of a last confirmed transmitted directory update transaction, the assigned sequence numbers of all directory update transactions in the series being consecutive, such that each directory update transaction after the last confirmed directory update transaction is selected;
   transmitting the selected series of directory update transactions from the originating directory node to the responding directory node;
   receiving in the responding directory node at least one of the directory update transactions in the transmitted series of directory update transactions;
   updating the contents of the user directory stored in the responding directory node by processing any directory update transactions received in the responding directory node whose sequence numbers are consecutive to each other and consecutive to a responding directory node synchronization number that stores the sequence number of a last processed directory update transaction;
   transmitting from the responding directory node to the originating directory node a confirmation message indicating the largest consecutive sequence number of the directory update transactions received and processed in the responding directory node; and
   upon receiving the transmitted confirmation message in the originating directory node, setting the originating directory node synchronization number to the sequence number indicated by the confirmation message thereby completing the synchronization of the user directory stored in the responding directory node with the user directory stored in the originating directory node, such that the originating directory node transmits to the responding directory node in each synchronization cycle all directory update transactions acquired after the last confirmed directory update transaction, irrespective of whether these directory update transactions were previously transmitted, so that the responding directory node can receive all of these transactions in order even though some of these transactions may have been previously received in the responding directory node.

6. The computer-readable medium of claim 5 wherein the step of updating the contents of the user directory further comprises the steps of:
   if one or more directory update transactions is processed, changing the value of the responding directory node synchronization number to the largest sequence number among the processed directory update transactions; and
   if no directory update transactions are processed, inhibiting the step of transmitting the confirmation message from the responding directory node to the originating directory node.

7. A method in a computer system for synchronizing the remote execution of an ordered series of transactions transmitted from an originating node to a responding node, the method comprising the steps of:
   in the originating node:
      assigning consecutive sequence numbers to the transactions in the ordered series;
      at each of a plurality of transmission times:
         identifying each transaction in the ordered series having a sequence number larger than a last confirmed sequence number value, and
         transmitting to the responding node a batch of a plurality of transactions including each identified transaction;
   in the responding node, for each batch of transactions received from the originating node:
      selecting each transaction included in the received batch that is consecutive to a last executed sequence number value;
      executing the selected transactions of the batch;
      ignoring the unselected transactions of the batch;
      if any transactions are executed:
         transmitting to the originating node a confirmation containing the highest sequence number of the executed transactions;
         setting the last executed sequence number value to the highest sequence number of the executed transactions; and
   in the originating node:
      for each confirmation received from the responding node, setting the last confirmed sequence number value to the sequence number in the confirmation, such that the originating code transmits to the responding node all transactions whose sequence number is larger than the last contained sequence number, irrespective of whether these transactions were previously transmitted, so that the responding node can receive all of these transactions in sequence number order even though some of these transactions may have been previously received in the responding node.

8. The method of claim 7 wherein the executing step includes a step of ignoring any transactions included in the batch whose sequence numbers are not consecutive to the last executed sequence number value.

9. The method of claim 7 wherein the transmitting step includes the step of retransmitting transactions executed by the responding node but for which no confirmation has been received in the originating node.

10. The method of claim 7, further including the step of adding transactions to the ordered series between a first and a second of the transmission times.

11. The method of claim 7 wherein the transmitting step in the originating node includes the step of transmitting a first batch of transactions comprising a transaction having a first sequence number through a transaction having a second sequence number, and wherein the receiving step includes the step of receiving only a portion of the first batch of transactions from the transaction having the first sequence number to a transaction having a third sequence number, and wherein the executing step includes the step of executing the received transactions from the first sequence number to the third sequence number, and wherein the transmitting step in the originating node includes the step of transmitting a confirmation containing the third sequence number, and wherein the transmitting step in the originating node further includes the step of transmitting a second batch of transactions comprising a transaction having a fourth sequence number immediately succeeding the third sequence number through a transaction having a fifth sequence number at least as large as the second sequence number, such that transactions from the transaction having the fourth sequence number through the transaction having the second sequence number are transmitted a second time.

12. The method of claim 7 wherein the transmitting step in the originating node includes the step of transmitting a first batch of transactions comprising a transaction having a first sequence number through a transaction having a second sequence number, and wherein the receiving step includes the step of receiving only a portion of the first batch of transactions not including the transaction having the first sequence, and wherein the ignoring step ignores all of the transactions received in the first batch, and wherein the transmitting step in the originating node further includes the step of transmitting a second batch of transactions comprising the transaction having the first sequence number through a transaction having a third sequence number at least as large as the second sequence number, such that transactions from the transaction having the first sequence number through the transaction having the second sequence number are transmitted a second time.

13. The method of claim 7 wherein the transmitting step in the originating node includes the step of transmitting a first batch of transactions comprising a transaction having a first sequence number through a transaction having a second sequence number, and wherein the receiving step includes the step of never receiving the first batch of transactions, and wherein the transmitting step in the originating node further includes the step of transmitting a second batch of transactions comprising the transaction having the first sequence number through a transaction having a third sequence number at least as large as the second sequence number, such that transactions from the transaction having the first sequence number through the transaction having the second sequence number are transmitted a second time.

14. The method of claim 7 wherein the transmitting step in the originating node includes the step of transmitting a first batch of transactions comprising a transaction having a first sequence number through a transaction having a second sequence number, and wherein the delivery of the first batch is delayed, and wherein the transmitting step in the originating node further includes the step of transmitting a second batch of transactions comprising the transaction having the first sequence number through a transaction having a third sequence number at least as large as the second sequence number, such that transactions from the transaction having the first sequence number through the transaction having the second sequence number are transmitted a second time, and wherein the receiving step includes the step of receiving the second batch of transactions before the first batch of transactions, and wherein the executing step includes the step of executing all of the transactions of the second batch of transactions, and wherein the transmitting step in the originating node for the second batch includes the step of transmitting a confirmation containing the third sequence number, and wherein the receiving step further includes the step of receiving the first batch of transactions after the second batch of transactions, and wherein the executing step includes the step of executing none of the transactions of the first batch of transactions.

15. The method of claim 7 wherein the transmitting step in the originating node includes the step of transmitting a first batch of transactions comprising a transaction having a first sequence number through a transaction having a second sequence number, and wherein the receiving step includes the step of receiving the first batch of transactions, and wherein the executing step includes the step of executing the received transactions of the first batch, and wherein the transmitting step in the originating node includes the step of transmitting a confirmation containing the second sequence number, and wherein the confirmation containing the second sequence number is never received in the originating node, and wherein the transmitting step in the originating node further includes the step of transmitting a second batch of transactions comprising the transaction having the first sequence number through a transaction having a third sequence number larger than the second sequence number, such that transactions from the transaction having the first sequence number through the transaction having the second sequence number are transmitted a second time, and wherein the executing step includes the step of executing the only the transactions of the second batch from a fourth sequence number immediately subsequent to the second sequence number to the third sequence number.

16. The method of claim 7 wherein the transmitting step in the originating node includes the step of transmitting a first batch of transactions comprising a transaction having a first sequence number through a transaction having a second sequence number, and wherein the receiving step includes the step of receiving the first batch of transactions, and wherein the executing step includes the step of executing the received transactions of the first batch, and wherein the transmitting step in the originating node includes the step of transmitting a confirmation containing the second sequence number, and wherein delivery of the confirmation containing the second sequence number is delayed, and wherein the transmitting step in the originating node further includes the step of transmitting a second batch of transactions comprising the transaction having the first sequence number through a transaction having a third sequence number larger than the second sequence number, such that transactions from the transaction having the first sequence number through the transaction having the second sequence number are transmitted a second time, and wherein the executing step includes the step of executing the only the transactions of the second batch from a fourth sequence number immediately subsequent to the second sequence number to the third sequence number, and wherein the transmitting step in the originating node further includes the step of transmitting a confirmation containing the third sequence number, and wherein the confirmation containing the third sequence number is received in the originating node before the confirmation containing the second sequence number, and wherein, in response to receiving the confirmation containing the third sequence number, the setting step in the originating node sets the last confirmed sequence number value to the third sequence number, and wherein the confirmation containing the second sequence number is received in the originating node after the confirmation containing the third sequence number, and wherein, in response to receiving the confirmation containing the third sequence number, the setting step in the originating node does not set the last confirmed sequence number value to the second sequence number.

17. A computer-readable medium whose contents cause nodes in a computer network to synchronize the remote execution of an ordered series of transactions by performing the steps of:

in an originating node:
assigning consecutive sequence numbers to the transactions in the ordered series;
at each of a plurality of transmission times:
identifying each transaction in the ordered series at the transmission time having a sequence number larger than a last confirmed sequence number value, and
transmitting to the responding node a batch of a plurality of transactions including each identified transaction;

in the responding node, for each batch of transactions received from the originating node:
selecting each transaction included in the received batch that is consecutive to a last executed sequence number value;
executing the selected transactions of the batch;
ignoring the unselected transactions of the batch;
if any transactions are executed:
transmitting to the originating node a confirmation containing the highest sequence number of the executed transactions;
setting the last executed sequence number value to the highest sequence number of the executed transactions; and in the originating node:
for each confirmation received from the responding node, setting the last confirmed sequence number value to the sequence number in the confirmation, such that the originating code transmits to the responding node all transactions whose sequence number is larger than the last contained sequence number, irrespective of whether these transactions were previously transmitted, so that the responding node can receive all of these transactions in sequence number order even though some of these transactions may have been previously received in the responding node.

18. The computer-readable medium of claim 17 wherein the executing step includes a step of ignoring any transactions included in the batch whose sequence numbers are not consecutive to the last executed sequence number value.

19. The computer-readable medium of claim 17 wherein the transmitting step includes the step of retransmitting transactions executed by the responding node but for which no confirmation has been received in the originating node.

20. An apparatus for synchronizing the remote execution of an ordered series of transactions, comprising:
a responding node that executes transactions and transmits confirmations identifying executed transactions; and
an originating node communicatively connected to the responding node from which transactions are transmitted to the responding node and to which confirmations are transmitted by the responding node,
the originating node assigning consecutive sequence numbers to the transactions in the ordered series,
the originating node further identifying each transaction in the ordered series having a sequence number larger than a last confirmed sequence number,
the originating node further transmitting to the responding node, at each of a plurality of transmission times, a batch of a plurality of transactions including each identified transaction,
the responding node, for each batch of transactions received from the originating node, selecting any transactions included in the batch that are consecutive to a last executed sequence number value,
the responding node further executing any selected transactions, ignoring any unselected transactions, and, if any transactions are executed, transmitting to the originating node a confirmation containing the highest sequence number of the executed transactions and setting the last executed sequence number value to the highest sequence number of the executed transactions, the originating node further setting the last confirmed sequence number value to the sequence number in each received confirmation, such that the originating code transmits to the responding node all transactions whose sequence number is larger than the last contained sequence number, irrespective of whether these transactions were previously transmitted, so that the responding node can receive all of these transactions in sequence number order even though some of these transactions may have been previously received in the responding node.

21. The apparatus of claim 20 wherein the responding node does not execute transactions included in each batch whose sequence numbers are not consecutive to the last executed sequence number value.

22. The apparatus of claim 20 wherein the originating node retransmits transactions executed by the responding node for which no confirmation has been received in the originating node.

23. A method in a computer system for synchronizing the remote execution of a ordered series of transactions, the method comprising the steps of:

in an originating node:
at each of a plurality of transmission times, identifying and transmitting to a responding node a batch of a plurality of transactions including each transaction in the ordered series not yet identified in a confirmation received from the responding node;

in the responding node, for each batch of transactions received from the originating node:
selecting and executing only those transactions included in the batch that have not yet been executed in the responding node and that are consecutive to the transactions already executed in the responding node, ignoring any unselected transactions included in the batch; and if any transactions are executed, transmitting to the originating node a confirmation identifying the executed transactions, such that the originating node transmits to the responding node all transactions in the ordered series after the last transaction confirmed, irrespective of whether these transactions were previously transmitted, so that the responding node can receive all of these transactions in order even though some of these transactions may have been previously received in the responding node.

24. The method of claim 23 wherein the executing step includes a step of ignoring any transactions included in the batch that are not consecutive to the transactions already executed.

25. The method of claim 23 wherein the transmitting step includes the step of retransmitting transactions executed by the responding node but for which no confirmation has been received in the originating node.

26. The method of claim 23, further including the step of adding transactions to the ordered series between a first and a second of the transmission times.

27. A computer-readable medium whose contents cause nodes in a computer network to synchronize the remote execution of an ordered series of transactions by performing the steps of:

in an originating node:
at each of a plurality of transmission times, identifying and transmitting to a responding node a batch of a plurality of transactions including each transaction in the ordered series at the transmission not yet identified in a confirmation received from the responding node;

in the responding node, for each batch of transactions received from the originating node:
selecting and executing only those transactions included in the batch that have not yet been executed in the responding node and that are consecutive to the transactions already executed in the responding node, ignoring only unselected transactions included in the batch; and if any transactions are executed, transmitting to the originating node a confirmation identifying the executed transactions, such that the originating node transmits to the responding node all transactions in the ordered series after the last transaction confirmed irrespective of whether these transactions were previously transmitted, so that the responding node can receive all of these transactions in order even though some of these transactions may have been previously received in the responding node.

28. The computer-readable medium of claim 27 wherein the executing step includes a step of ignoring any transactions included in the batch that are not consecutive to the transactions already executed.

29. The computer-readable medium of claim 27 wherein the transmitting step includes the step of retransmitting transactions executed by the responding node but for which no confirmation has been received in the originating node.

30. An apparatus for synchronizing the remote execution of an ordered series of transactions, the method, comprising:

a responding node that executes transactions and transmits confirmations identifying executed transactions; and an originating node communicatively connected to the responding node from which transactions are transmitted to the responding node, the originating node identifying and transmitting, at each of a plurality of transmission times, a batch of a plurality of transactions including each transaction in the ordered series at the transmission not yet identified in a confirmation received from the responding node, the responding node, for each batch of transactions received from the originating node:
selecting and executing only those transactions included in the batch that have not yet been executed in the originating node and that are consecutive to the transactions already executed in the responding node, ignoring any unselected transactions included in the batch; and if any transactions are executed, transmitting to the originating node a confirmation identifying the executed transactions, such that the originating node transmits to the responding node all transactions in the ordered series after the last transaction confirmed, irrespective of whether these transactions were previously transmitted, so that the responding node can receive all of these transactions in order even though some of these transactions may have been previously received in the responding node.

31. The apparatus of claim 30 wherein the responding node ignores any transactions included in the batch that are not consecutive to the transactions already executed.

32. The apparatus of claim 30 wherein the originating node retransmits transactions executed by the responding node for which no confirmation has been received in the originating node.

33. A method in a computer system for error-tolerant transmission of an ordered series of transactions from an originating node to a responding node, comprising the steps of:

assigning consecutive sequence numbers to the transactions in the ordered series;

at each of a plurality of transmission times:

identifying each transaction in the ordered series having a sequence number larger than a last confirmed sequence number value, and transmitting to the responding node a batch of a plurality of transactions including each identified transaction;

receiving confirmations from the responding node each specifying the sequence number of the last transaction processed in the responding node; and for each confirmation received from the responding node, setting the last confirmed sequence number value to the sequence number specified by the confirmation, such that the originating code transmits to the responding node all transactions whose sequence number is larger than the last contained sequence number, irrespective of whether these transactions were previously transmitted, so that the responding node can receive all of these transactions in sequence number order even though some of these transactions may have been previously received in the responding node.

34. A method in a computer system for error-tolerant receipt and execution of an ordered series of transactions sent from an originating node to a responding node, comprising the steps of:

receiving batches of transactions from the originating node, each transaction having a sequence number;

for each batch of transactions received:

selecting each transaction included in the received batch that is consecutive to a last executed sequence number value;

executing the selected transactions of the batch;

ignoring the unselected transactions of the batch; and if any transactions are executed:

transmitting to the originating node a confirmation containing the highest sequence number of the executed transactions, and setting the last executed sequence number value to the highest sequence number of the executed transactions, such that only received transactions that are consecutive to the last executed transaction are executed, and such that only executed transactions are confirmed so that any transactions subsequent to the last executed transactions are transmitted by the originating node in the next batch irrespective of whether such subsequent transactions have already been transmitted.

35. A computer-implemented method in an originating node for error-tolerant transmission of ordered transactions from the originating node to first and second responding nodes, the originating node maintaining a latest confirmed transaction for each of the first and second responding nodes, the method comprising:

(a) accumulating a first plurality of ordered transactions for transmission to the responding nodes, the first plurality comprising an initial transaction followed by a plurality of transactions ending with an intermediate transaction followed by a plurality of transactions ending with a last transaction;

(b) transmitting as a group the first plurality of ordered transactions to each of the responding nodes;

(c) receiving a single confirmation of processing the transactions in the transmitted group by the first responding node;

(d) in response to step (c), setting the first responding node latest confirmed transaction to the last transaction;

(e) receiving a single confirmation of processing all transactions from the initial transaction to the intermediate transaction by the second responding node;

(f) in response to step (e), setting the second responding node latest confirmed transaction to the intermediate transaction;

(g) accumulating a second plurality of ordered transactions;

(h) transmitting as a group to the first responding node all transactions that accumulated after the first responding node latest confirmed transaction, such that only the second plurality of ordered transactions are transmitted; and (i) transmitting as an ordered group to the second responding node all transactions that accumulated after the second responding node latest confirmed transaction, such that both the transactions in the first plurality following the intermediate transaction and the second plurality of transactions are transmitted.

36. The method of claim 35 wherein each responding node maintains a latest processed transaction such that any transactions received by a responding node that are not consecutive in order to the latest processed transaction for the responding node are not processed.

37. A computer memory containing a transaction processing status data structure usable by an originating node with a first plurality of ordered transactions to conduct error-tolerant transmission of transactions to first and second responding nodes, the first plurality comprising an initially accumulated transaction followed by a plurality of accumulated transactions ending with an intermediate transaction followed by a plurality of accumulated transactions ending with a last transaction, the data structure comprising:

a first responding node transaction value indicating a latest transaction whose processing by the first responding node has been confirmed, wherein, after the first plurality of ordered transactions is transmitted as a group to the first responding node and after a single confirmation is received from the first responding node of processing the transactions in the transmitted group, the first responding node transaction value indicates the last transaction; and a second responding node transaction value indicating a latest transaction whose processing by the second responding node has been confirmed, wherein, after the first plurality of ordered transactions is transmitted as a group to the second responding node and after a single confirmation is received from the second responding node of processing all transactions from the initial transaction to the intermediate transaction, the second responding node transaction value indicates the intermediate transaction, such that, after the originating node accumulates a second plurality of ordered transactions, the first responding node transaction value indicates that a group consisting only of the transactions in the second plurality of ordered transactions is to be transmitted to the first responding node and the second responding node transaction value indicates that an ordered group consisting of all transactions in the first plurality after the intermediate transaction and all transactions in the second plurality of transactions is to be transmitted to the second responding node.

38. The computer memory of claim 37 additionally containing a processed transaction status data structure comprising:

a second responding node processed transaction value indicating a latest transaction processed by the second responding node, wherein, after the second responding node processes all transactions in the first plurality of ordered transactions from the initial transaction to the intermediate transaction, the second responding node processed transaction value indicates the intermediate transaction, such that after the originating node transmits additional ordered transactions to the second responding node, the second responding node processed transaction value indicates that only additional transactions consecutive in order to the intermediate transaction are to be processed by the second responding node.

39. A computer-readable medium containing instructions that cause an originating node to perform error-tolerant transmission of ordered transactions from the originating node to first and second responding nodes, the originating node maintaining a latest confirmed transaction for each of the first and second responding nodes, by performing the steps of:

(a) accumulating a first plurality of ordered transactions for transmission to the responding nodes, the first plurality comprising an initial transaction followed by a plurality of transactions ending with an intermediate transaction followed by a plurality of transactions ending with a last transaction;

(b) transmitting as a group the first plurality of ordered transactions to each of the responding nodes;

(c) receiving a single confirmation of processing the transactions in the transmitted group by the first responding node;

(d) in response to step (c), setting the first responding node latest confirmed transaction to the last transaction;

(e) receiving a single confirmation of processing all transactions from the initial transaction to the intermediate transaction by the second responding node;

(f) in response to step (e), setting the second responding node latest confirmed transaction to the intermediate transaction;

(g) accumulating a second plurality of ordered transactions;

(h) transmitting as a group to the first responding node all transactions that accumulated after the first responding node latest confirmed transaction, such that only the second plurality of ordered transactions are transmitted; and (i) transmitting as an ordered group to the second responding node all transactions that accumulated after the second responding node latest confirmed transaction, such that both the transactions in the first plurality following the intermediate transaction and the second plurality of transactions are transmitted.

40. The computer-readable medium of claim 39 wherein each responding node maintains a latest processed transaction such that any transactions received by a responding node that are not consecutive in order to the latest processed transaction for the responding node are not processed.

* * * * *